United States Patent
Sood et al.

(10) Patent No.: US 12,028,930 B2
(45) Date of Patent: Jul. 2, 2024

(54) OPTIMIZATION FOR ROAMING GEOLOCATED HOME NETWORK GATEWAY SELECTION

(71) Applicant: T-MOBILE USA, INC., Bellevue, WA (US)

(72) Inventors: Romil Sood, Bellevue, WA (US); Kunal Barawkar, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 30 days.

(21) Appl. No.: 17/218,918

(22) Filed: Mar. 31, 2021

(65) Prior Publication Data

US 2022/0322066 A1   Oct. 6, 2022

(51) Int. Cl.
| | |
|---|---|
| *H04W 4/02* | (2018.01) |
| *H04W 8/06* | (2009.01) |
| *H04W 8/12* | (2009.01) |
| *H04W 48/16* | (2009.01) |
| *H04W 88/16* | (2009.01) |

(52) U.S. Cl.
CPC ............. *H04W 8/12* (2013.01); *H04W 4/023* (2013.01); *H04W 8/06* (2013.01); *H04W 48/16* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 2008/0080365 A1* | 4/2008 | Weeresinghe | H04L 69/40 370/216 |
| 2012/0084449 A1* | 4/2012 | Delos Reyes | H04W 12/062 709/229 |
| 2017/0230877 A1* | 8/2017 | Claassen | H04W 36/0016 |
| 2019/0082362 A1* | 3/2019 | Xu | H04W 36/0022 |
| 2020/0167148 A1* | 5/2020 | Park | G06F 8/65 |
| 2020/0204984 A1* | 6/2020 | Dodd-Noble | H04W 76/12 |
| 2021/0266702 A1* | 8/2021 | Huang | H04W 4/02 |

* cited by examiner

*Primary Examiner* — German Viana Di Prisco
(74) *Attorney, Agent, or Firm* — Lee & Hayes, P.C.

(57) ABSTRACT

The current disclosure relates to a system and method for optimizing network access for a roaming device. In particular, the method includes receiving a request for network access from a client device. The method then determines if the device is roaming. If the device is roaming, the method then includes selecting one or more gateways for the roaming device and transmitting the selected gateways to the roaming device. Such gateways may be selected based upon device location within the roaming network to reduce latency or improve other performance metrics.

17 Claims, 3 Drawing Sheets

410   415   420
topon.S8.host.site.pool.epc.mnc020.mcc334.3gppnetwork.org 450   455   460
topon.S8.host.site.pool.epc.mnc260.mcc310.3gppnetwork.org

OPTIMIZATION FOR ROAMING GEOLOCATED HOME NETWORK GATEWAY SELECTION

FIELD OF THE DISCLOSURE

The present disclosure generally relates to systems and methods for optimizing operability for roaming devices in a cellular telephone network using geolocation to determine appropriate network access points in the visited network.

BACKGROUND

Cellular communication networks provide users with the ability to wirelessly connect a mobile device to the network in order to make phone calls and/or to access the internet. Typically, devices are configured for use in a particular geographic area (i.e., the "home network"). When the device leaves the home network, the device may enter "roaming mode," which may be generically configured to operate in the foreign/visited network. Currently, mobile devices and networks are configured to use predetermined preferred roaming gateways, which may be located at a significant distance from a current location of a roaming device. Such distance between the roaming mobile device and a predetermined gateway is a source of significant latency under certain conditions. Additionally, gateways predetermined in a static manner may become overloaded based upon unbalanced communication loads, thereby reducing network performance.

SUMMARY

As described further herein, the disclosure generally relates to systems, methods, and non-transitory computer-readable media storing instructions for optimizing network access for a roaming device using geolocation. An embodiment of the present disclosure includes a system for determining network access for a roaming device, the system including, a visited communication network, a home communication network, a client device communicatively coupled to the visited communication network, one or more non-transitory storage media configured to store processor-executable instructions, and one or more processors operatively connected to the visited communication network and the one or more non-transitory storage media and configured to execute the processor-executable instructions to cause the system to: receive a request for access from the client device and determine that the client device is roaming. The instructions may then cause the system to transmit a query to the home network of the client device, the query including a geographic location of the client device and receive a selection of one or more network gateways for the client device based on the query. The instructions may then cause the system to transmit the selection of the one or more network gateways to the client device.

The instructions may further cause the system to determine if the one or more gateways are suitable and transmit the one or more gateways if they are determined to be suitable. The instructions may further cause the system to evaluate each of the one or more gateways to determine the proximity of the gateway to the client device, compare the proximity of each of the one or more gateways to the proximity of each of a plurality of gateways of the visited communication network to determine a set of gateways having a closest geographic proximity to the client device, and transmit the set of gateways to the client device.

This summary is not comprehensive and is necessarily limited to certain aspects of the invention described herein. Additional or alternative components, aspects, functions, or actions may be included in various embodiments, as described further below.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

The current disclosure is aimed at improving network access for roaming devices (i.e., devices that are outside of their home network). Currently, a roaming device may be configured to default to a particular access point and/or gateway in a visited network when roaming. However, this may cause latency as the access point may be physically distant from the roaming device. For example, a roaming device may be visiting New York City in the United States but configured to communicate with the visited network through an access point located in Los Angeles. In another example, the roaming device may be configured to access the internet through a gateway in the home network. In each of these examples, the roaming device may experience latency in upload/download times and or a poor connection due to the excessive distance between the device and the access point/gateway.

The current disclosure implements geolocation to determine an appropriate access point/gateway in the visited network for the roaming device to use for network access. Instead of connecting to a default gateway/access point while in the visited network, the current system uses the geographic location of the device to determine one or more gateways/access points for the client device to use to when connecting to the network.

Figure 1:
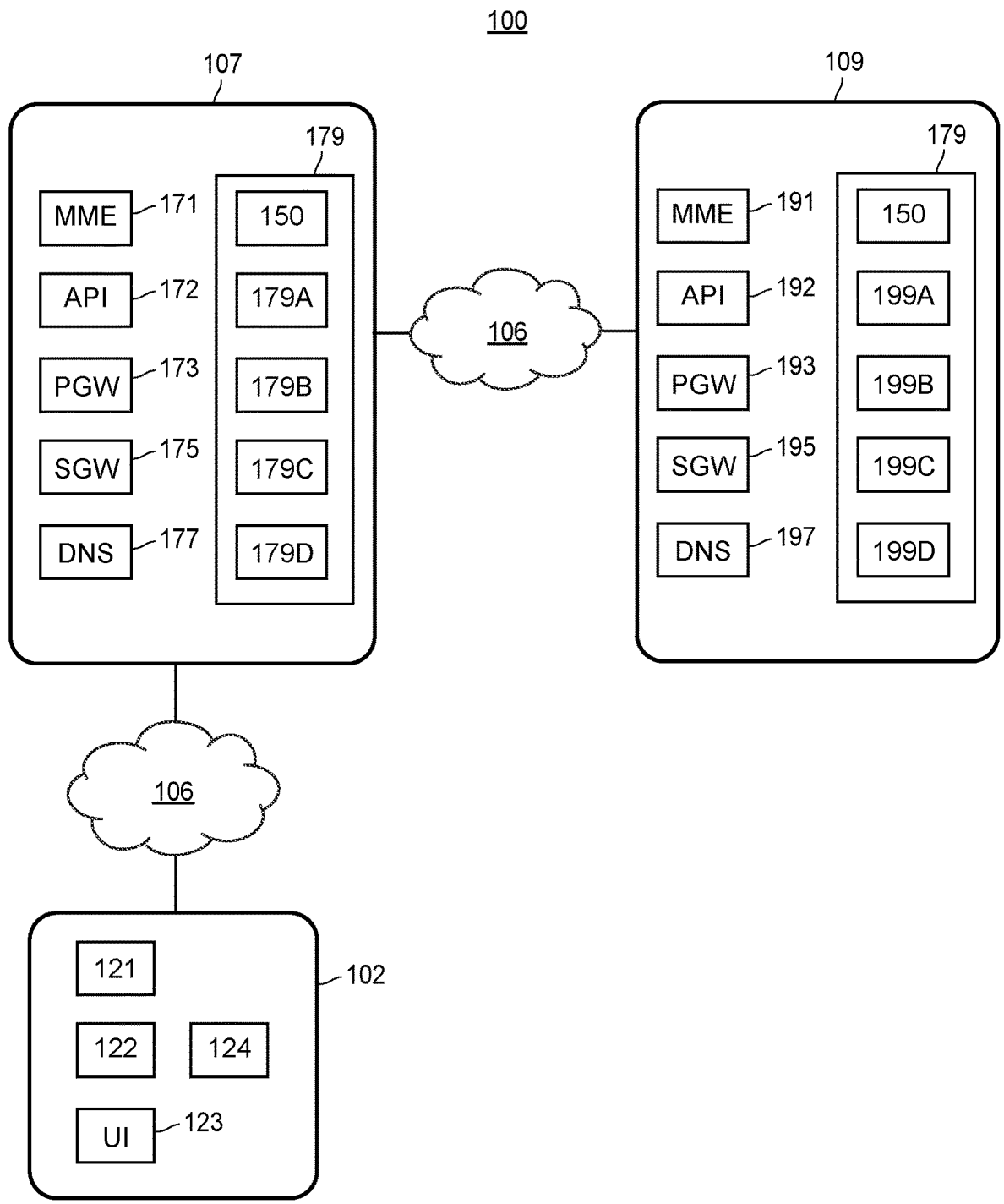
FIG. 1 illustrates an example system for optimizing network access for roaming devices.

An example computing environment in which the system of this disclosure can operate is discussed first with reference to FIG. 1, followed by a discussion of several example use cases and methods that can be implemented in the system. FIG. 1 illustrates a block diagram of an example system 100 in accordance with an exemplary embodiment of the present disclosure. The system 100 may implement the techniques outlined above and described in further detail below. The system 100 may include a client device 102, a visited network 107, a communication link 106, and a home network 109. Although FIG. 1 only illustrates a single example of each component for simplicity, it should be understood that any suitable number of devices and components 102, 107, and 109 may be included in the system 100.

FIG. 1 includes a client device 102 which may be, for example, a smart phone, a tablet, or any other suitable device that can be operatively connected to a communication network and have roaming capabilities. The computing environment 100 in general can include any suitable number of client devices 102 operating and communicatively coupled to the visited communication network 107 and/or the home communication network 109 via a communication link 106.

The client device 102 includes a memory 121, one or more processors 122, a user interface (UI) 123, and a network interface 124. The memory 121 may be a non-transitory memory and may include an operating system 121A and one or several suitable memory modules, such as random-access memory (RAM), read-only memory (ROM), flash memory, other types of persistent memory, etc. The memory 121 may include a universal integrated circuit card (UICC) including a subscriber identity module (SIM) or universal mobile telecommunications service (UMTS) SIM (USIM) application to facilitate connectivity by storing a subscriber identity and network connection parameters for the client device 102. The network interface 124 may support any suitable communication protocol to communicate with communication networks 107 and 109 and other devices via the communication links 106. The UI 123 may include any suitable combination of input devices such as a touchscreen, a keyboard, a microphone, etc. and output devices such as screens, speakers, etc. The memory 121 stores an operating system (OS) 121A, which can be any type of suitable mobile or general-purpose operating system.

The client device 102 is communicatively coupled to a visited communication network 107. In an embodiment, the visited communication network 107 may be a proprietary communication network. The visited communication network 107 provides one or more network-native communication functionalities for telecommunications between user equipment, such as voice or video calls between users of the visited communication network 107. In some embodiments, the visited communication network 107 is a telecommunications network providing voice and data communication between service subscribers having accounts with the operator of the visited communication network 107 (or with operators of interconnected communication networks, such as home communication network 109).

The visited communication network 107 includes a plurality of components to receive, send, process, generate, and route data between end users and among components of the visited communication network 107. Although only relevant components of the visited communication network 107 are illustrated, a person of ordinary skill in the art will understand additional components may be included to facilitate communication. Additionally, although illustrated as separate components, some or all of the components of the visited communication network 107 may be combined in various combinations in various embodiments.

In the some embodiments, the visited communication network 107 includes a Mobility Management Entity 171, an API gateway 172, packet data network gateways (PGWs) 173, serving gateways (SGWs) 175, a domain network system (DNS) 177, and a server 179.

The MME 171 is configured to authenticate user accounts associated with the visited communication network 107 based upon user credentials. Further, the MME 171 may be configured to manage device access to the communication network 107, including providing access tokens and enforcing access policies. The API gateway 172 is configured to provide access to the communication network 107 to the client device 102 including serving as a pass-through gateway to the communication network 107 following authentication and registration.

The PGW 173 is configured as a gateway to allow a client device 102 to have access to the data network. In this manner, the PGW 173 may act as a router providing the client device 102 with access to the network. The SGW 175 is configured to maintain and provide information regarding the status of service lines. For example, the SGW 175 may be configured to connect the client device 102 to the native functionalities of the proprietary communication network 107 via a PGW 173 in order to enable direct real-time audio, video, or other data channels between user devices. The SGW 175 may be configured to adapt communication for the PGW 173 to establish communication connections and facilitate service line registration. The DNS 177 provides domain name/IP look up for the visited communication network 107. These components of the communication network 107 may be accessed and used (directly or indirectly) to establish communication connections and implement network functionalities for network-native communications.

The visited communication network 107 may also include one or more servers 179. The server 179 receives data from the client device 102 and other client devices, and further receive/retrieve data from other sources, such as other servers and/or databases. For simplicity, FIG. 1 illustrates the server 179 as only one instance of a server device. However, the server 179 according to some implementations includes a group of one or more server devices, each equipped with one or more processors and capable of operating independently of the other server devices. Server devices operating in such a group can process requests from the client device 102 individually (e.g., based on availability), in a distributed manner where one operation associated with processing a request is performed on one server device while another operation associated with processing the same request is performed on another server device, or according to any other suitable technique. For the purposes of this discussion, the term "server" refers either to an individual server device or to a group of two or more server devices.

Further, any of the components 171, 172, 173, 175, 177 of visited communication network 107 may either be implemented or partially implemented by the server 179. In other embodiments, the components 171, 172, 173, 175, 177 of visited communication network 107 may be communicatively coupled to the server 179 in order to execute functions of the network.

With continued reference to FIG. 1, the server 179 includes one or more processors 179A, a network interface 179B, and a non-transitory memory 179C (e.g., a hard disk, a flash drive). The memory 179C may be a non-transitory memory and may include one or several suitable memory modules, such as random-access memory (RAM 179D), read-only memory (ROM), flash memory, other types of persistent memory, etc. In an embodiment, the memory 179C may store instructions that implement network optimization via a roaming application 150. The instructions that implement the roaming application 150 are executable on the one or more processors 179A.

Among other components, the visited communication network 107 includes one or more telephony application servers 179 which include applications to execute functions to facilitate operability of the visited communication network 107. The server 179 may include components that receive, process, produce, transmit, and store data. The server 179 may include one or more applications to implement one or more of the functions of the various components of the visited communication network 107 (e.g., MME 171, the API gateway 172, PGW 173, SGW 175, DNS 177) discussed elsewhere herein.

The server 179 also includes a communication interface 1796 configured to send and receive electronic communication messages between the server 179 and external computing devices (e.g., client devices 102 and server 199) via the communication link 106. The network interface 179B may support any suitable communication protocol to communicate with remote servers and other components of the visited communication network 107. In this manner, the server 179 and/or client device 102 implement the roaming application 150 to communicate with necessary components to determine an appropriate access point/gateway to access the visited communication network 107.

The visited communication network 107 is further communicatively coupled to a home communication network 109. In an embodiment, the home communication network 109 may be a proprietary communication network. The home communication network 107 provides one or more network-native communication functionalities for telecommunications between user equipment, such as voice or video calls between users of the home communication network 109. In some embodiments, the home communication network 109 is a telecommunications network providing voice and data communication between service subscribers having accounts with the operator of the home communication network 109 (or with operators of interconnected communication networks, such as visited communication network 107).

The home communication network 109 includes a plurality of components to receive, send, process, generate, and route data between end users and among components of the home communication network 109. Although only relevant components of the home communication network 109 are illustrated, a person of ordinary skill in the art will understand additional components may be included to facilitate communication. Additionally, although illustrated as separate components, some or all of the components of the home communication network 109 may be combined in various combinations in various embodiments.

In the some embodiments, the home communication network 109 includes a Mobility Management Entity 191, an API gateway 192, packet data network gateways (PGWs) 193, serving gateways (SGWs) 195, a domain network system (DNS) 197, and a server 199. The components 191, 192, 193, 195, 197, and 199 may be configured as described with respect to the corresponding components 171, 172, 173, 175, 177, and 179 of the visited communication network 107.

The MME 191 is configured to authenticate user accounts associated with the home communication network 109 based upon user credentials. Further, the MME 191 may be configured to manage device access to the home communication network 109, including providing access tokens and enforcing access policies. The API gateway 192 is configured to provide access to the home communication network 109 to a client device 102, including serving as a pass-through gateway to the visited communication network 107 following authentication and registration.

The PGW 193 is configured as a gateway to allow a client device 102 to have access to the data network. In this manner, the PGW 193 may act as a router providing access to the client device 102 to the network. The SGW 195 is configured to maintain and provide information regarding the status of service lines. For example, the SGW 195 may be configured to connect the client device 102 to the native functionalities of the home communication network 107 via a PGW 193 in order to enable direct real-time audio, video, or other data channels between user devices. The SGW 195 may be configured to adapt communication for the PGW 193 to establish communication connections and facilitate service line registration. The DNS 197 may provide domain name/IP look up for the home communication network 109. These components of the home communication network 109 may be accessed and used (directly or indirectly) to establish communication connections and implement network functionalities for network-native communications.

The home communication network 109 also includes one or more servers 199. The server 199 is configured to receive data from the client device 102 and other client devices, and further receive/retrieve data from other sources, such as other servers and/or databases. For simplicity, FIG. 1 illustrates the server 199 as only one instance of a server device. However, the server 199 according to some implementations includes a group of one or more server devices, each equipped with one or more processors and capable of operating independently of the other server devices. Server devices operating in such a group can process requests from the client device 102 individually (e.g., based on availability), in a distributed manner where one operation associated with processing a request is performed on one server device while another operation associated with processing the same request is performed on another server device, or according to any other suitable technique.

Further, any of the components 191, 192, 193, 195, 197 of home communication network 109 may either be implemented or partially implemented by the server 199. In other embodiments, the components 191, 192, 193, 195, 197 of home communication network 109 may be communicatively coupled to the server 179 in order to execute functions of the network.

With continued reference to FIG. 1, the server 199 includes one or more processors 199A, a network interface 199B, and a non-transitory memory 199C (e.g., a hard disk, a flash drive). The memory 199C may be a non-transitory memory and may include one or several suitable memory modules, such as random-access memory (RAM 199D), read-only memory (ROM), flash memory, other types of persistent memory, etc. In an embodiment, the memory 199C stores instructions that implement network optimization via roaming application 150. The instructions that implement the roaming application 150 are executable on the one or more processors 199A.

Among other components, the home communication network 109 includes one or more servers 199 which include applications to execute functions to facilitate operability of the home communication network 109. The server 199 includes components that receive, process, produce, transmit, and store data. The server 199 may include one or more applications to implement one or more of the functions of the various components of the home communication network 109 (e.g., MME 191, the API gateway 192, PGW 193, SGW 195, DNS 197) discussed elsewhere herein.

The server 199 also includes a communication interface 1998 configured to send and receive electronic communication messages between the server 199 and external computing devices (e.g., client devices 102 and server 179) via the communication link 106. The network interface 199B may also support any suitable communication protocol to communicate with remote servers and other components of the home communication network 109. In this manner, the server 199 and/or client device 102 implement the roaming application 150 to communicate with necessary components to determine an appropriate access point/gateway to access the visited communication network 107.

With continued reference to FIG. 1, the communication links 106 may be configured as any suitable wired and/or wireless network or direct communication connections configured to facilitate communications between one or more computing devices 102, visited communication network 107, and home communication network 109. For example, communication links 106 may couple one or more devices via one or more landline, Internet Service Provider (ISP) backbone connections, satellite links, public switched telephone networks (PSTNs), etc. To provide additional examples, communication links 106 may include portions of a proprietary network, a secure public internet, a mobile-based network, a virtual private network, etc. and may include any suitable number of interconnected network components that form an aggregate network system, such as dedicated access lines, plain ordinary telephone lines, satellite links, cellular base stations, a public switched telephone network (PSTN), etc., or any suitable combination thereof.

In some embodiments, communication links 106 may facilitate one or more computing devices 102 connecting to the Internet. In embodiments in which a communication link 106 facilitates a connection to the Internet, data communications may use one or more suitable Internet communication protocols. In various embodiments, communication links 106 may be implemented, for example, as a wireless telephony network (e.g., GSM, CDMA, LTE, etc.), a Wi-Fi network (e.g., via one or more IEEE 802.11 Standards), a WiMAX network, etc.

In various embodiments, the client device 102, the visited communication network 107, and home communication network 109 may store and/or access secure data that is of a private, proprietary, and/or sensitive nature. As a result, various embodiments of servers 179 and 199 communication links 106, and/or one or more client devices 102 may implement appropriate security protocols such as encryption, secure links, network authentication, firewalls, etc., to appropriately protect and secure such data.

Figure 2:
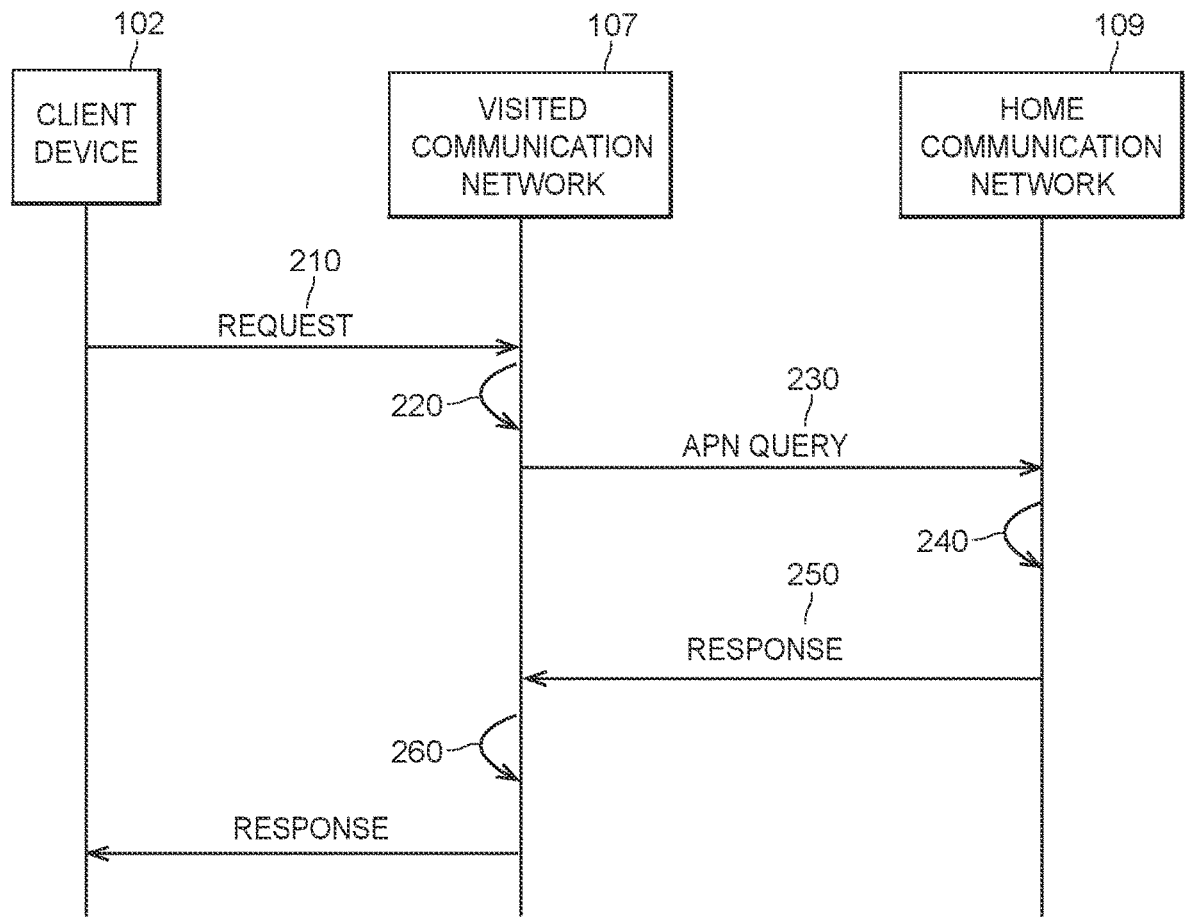
FIG. 2 illustrates a sequence diagram for components of the system of FIG. 1 for optimizing network access for a roaming device.

FIG. 2 illustrates a sequence diagram 200 for determining a access point/gateway for a roaming device, which may be performed by system 100 of FIG. 1, for example. For illustrative purposes, the components of the sequence diagram are discussed based on example components of the system 100 of FIG. 1. The sequence diagram 200 is for illustrative purposes and is not intended to be limiting. In various embodiments one or more components of the system may perform the various steps illustrated in the sequence diagram 200. In some embodiments, the roaming application 150 is tasked with causing some or all of the steps to be performed by the various components of the system.

The sequence starts when a client computing device 102 transmits a request to access the visited communication network (step 210). For example, The client device 102 may try to access a webpage or open an application that requires internet access. In another example, the client device 102 may try to make a phone call and/or send a text message. In some embodiments, the client device 102 also transmits GPS data and/or other geographic location data along with the request to access the visited communication network 107.

The visited communication network 107 then determines that the client device is a roaming device that is not registered at the visited communication network 107 (step 220). In various embodiments, one or more components of the visited communication network 107 determine that the client device 102 is roaming. For example, MME 171 may determine that the client device 102 is roaming upon receiving the request for network access. In another embodiment, the MME 171 may transmit an access point name (APN) query to the DNS 177 and/or other components of the visited communication network 107 to determine if the client device 102 is registered to the visited communication network 107.

After determining that the device does not belong to the visited communication network 107, the visited communication network 107 sends a query to the home communication network 109 that corresponds to the client device 102 (step 230). In some embodiments, the visited communication network 107 transmits the query as an APN query to the home network 109. In an example, the DNS 177 of the visited communication network 107 may be implemented to transmit the query to the home communication network 109. In some embodiments, the visited communication network 107 transmits the query along with current GPS data and/or a geographic location of the client device 102.

The home communication network 109 receives the query and then processes the query to determine one or more gateways and/or access points for the client device 102 to use to access the visited communication network 107 (step 240). The one or more gateways and/or access points may be nodes (e.g., gateways or access points) within the visited communication network 107 and/or nodes within another communication network (e.g., within a third communication network). In an embodiment, the DNS 197 of the home communication network 109 processes the query. The DNS 197 may look up one or more gateways and/or access points (such as gateways 173, 175, 1993, 195) from a database or a repository for the client device 102 to use to access the visited communication network 107. In an embodiment, the home network 109 determines the one or more gateways/access points based at least in part on the current geographic location of the client device 102. For example, the DNS 197 of the home network 109 may determine the PGW 173 that is closest to the client device 102 based on the current location of the client device 102 and select that particular PGW 173. In a further embodiment, the home communication network 109 determines a PGW 173/SGW 175 pair and/or one or more such pairs for the client device 102 to use to access the visited communication network 107.

The home communication network 109 then transmits the one or more selected gateways/access points back to the visited communication network 107 (step 250). In some embodiments, the visited communication network 107 then determines if the received gateways/access points are appropriate for the client device 102 (step 260). In an embodiment, the visited communication network 107 may simply determine if the received selected gateways/access points are functional, and transmit the gateways/access points only if they are function. In another embodiment, the visited communication network 107 may determine if the received selected gateways are the most appropriate for the client device 102 to use to access the network. For example, the visited communication network 107 may determine the distance between the received selected gateways and the client device 102. The visited communication network 107 may then perform a query to determine if there are other gateways and/or access points that are closer to the client device 102. If a set gateways are closer than the received selection, the visited communication network 107 may transmit the new set of gateways/access points.

Figures 3, 4:
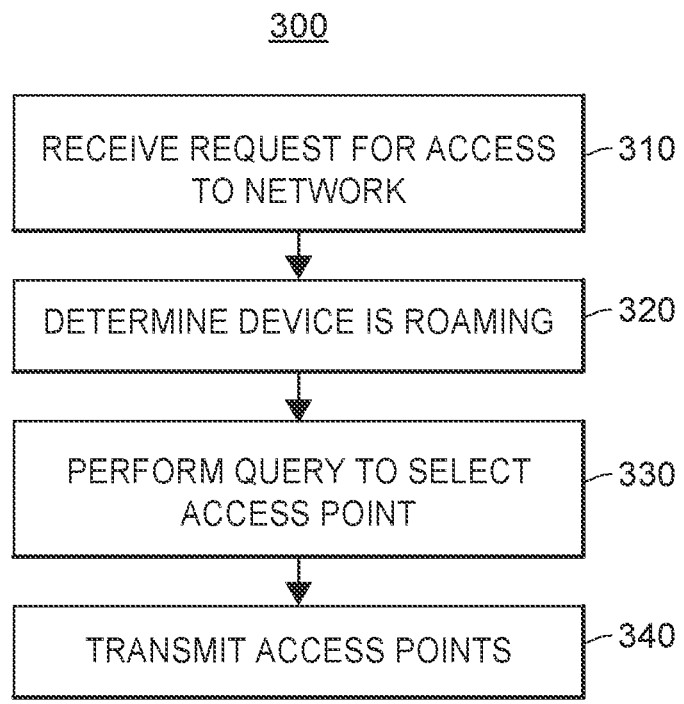
FIG. 3 illustrates an example method for optimizing network access for a roaming device.
FIG. 4 illustrates an example character string that may be produced by the system of FIG. 1.

The visited communication network 107 then transmits the one or more gateways/access points to the client device (step 270). In some embodiments, the visited communication network 107 transmits the one or more gateways/access points as a string of characters. For example, the one or more gateways/access points may be transmitted as an IP address. In another example, the one or more gateways/access points may be transmitted as a string of code in a programming language. FIG. 4, below, illustrates examples of how the one or more gateways/access points may be transmitted to the client device 102.

FIG. 3 illustrates a flow diagram of an exemplary method 300 for determining one or more gateways/access points for a roaming device. The method 300 may be implemented, as described above, by communicatively coupled components of the system 100 as illustrated in FIG. 1. In an embodiment, an application such as roaming application 150 causes one or more components of the system to perform various steps of the method 300 in order to provide one or more gateways/access points for a roaming device to use to access a visited network.

The method 300 begins upon receiving a request for network access from a client device (block 310). In an embodiment, the request for access also includes additional data typically transmitted between a client device and a communication network such as GPS data, data identifying the device, etc. The method then determines if the device is roaming (block 320). In an embodiment in which additional information is received from the client device, the method determines if the device is roaming based on the information transmitted along with the request.

If the method determines that the device is roaming, the method then performs a query to select an access point/gateway for the client device to use to access the communication network (block 330). In an embodiment, the method selects one or more access points and/or gateways (such as packet data network gateways (PGWs) or serving gateways (SGWs)). In a further embodiment, the method selects the one or more gateways by determining the gateways that are closest in proximity to the client device. In another embodiment, the method selects a gateway/access point that has the strongest communicative signal with the client device. The method then transmits the selected gateways and/or access points to the client device (block 340).

FIG. 4 illustrates example character strings that may be transmitted to the client device indicating the selected gateways. In FIG. 4, example string 410 illustrates a fully qualified domain name (FQDN) that may be implemented by a roaming device in the same manner as implemented in previously existing roaming systems. The string 410 includes a mobile network code (MNC) 415 and a mobile country code (MCC) 420. In previous roaming systems, MNC 415 and MCC 420 may be preconfigured as default access points, and point to gateways in the home network. Thus, when a device is roaming, the device may still try to communicate with gateways in the home network.

The character string 450 is an example FQDN that may be provided to a roaming device by a system of the current disclosure. In this string, the MNC 455 and MCC 460 may be selected based on a geographic location of the client device. For example, the MCC 460 indicates that the client device is located at index 'MCC310' which corresponds to the United States. The MNC 455 may indicate a network carrier that to for the client device to communicate with while roaming. Though not illustrated in the example, the system may be able to provide specific access points or gateways for the client device to access through a string of characters such as an IP address, a programming script, etc.

Although individual operations of one or more methods are illustrated and described as separate operations, one or more of the individual operations may be performed concurrently, and nothing requires that the operations be performed in the order illustrated. Structures and components presented as separate components in example configurations may be implemented as a combined structure or component. Similarly, structures and components presented as a single component may be implemented as separate components. These and other variations, modifications, additions, and improvements fall within the scope of the subject matter herein.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

The embodiments described above may be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly, impliedly, or inherently set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Further, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be any of X, Y, or Z, or any combination thereof.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed:

1. A system for determining network access for a client device roaming on a visited communication network, the system including:
   one or more non-transitory storage media configured to store processor-executable instructions; and
   one or more processors operatively connected to the visited communication network and the one or more non-transitory storage media and configured to execute the processor-executable instructions to cause the system to:
      receive a request for access from the client device, wherein the request includes global positioning system (GPS) data indicating a geographic location of the client device;
      determine that the client device is roaming;
      transmit a query to a home communication network of the client device, the query including the GPS data indicating the geographic location of the client device;
      receive a selection of one or more proposed network gateways disposed at one or more first locations for the client device from the home communication network based on the query;
      determine a selection of one or more other network gateways disposed at one or more additional locations;
      determine whether to transmit the selection of the one or more proposed network gateways or the selection of the one or more other network gateways based upon respective gateway functional statuses of the one or more proposed network gateways and the one or more other network gateways and respective proximities of the one or more first locations and the one or more additional locations to the geographic location of the client device; and
      transmit the selection of the one or more other network gateways to the client device based on a determination result.

2. The system of claim 1, wherein the one or more proposed gateways and the one or more other gateways belong to the visited communication network.

3. The system of claim 1, wherein the one or more proposed gateways and the one or more other gateways include at least one Packet Data Network Gateway.

4. The system of claim 1, wherein the instructions further cause the system to:
   evaluate each of a plurality of gateways of the visited communication network to determine a respective proximity of each of the plurality of gateways to the client device;
   compare the respective proximity of each of the plurality of gateways of the visited communication network to determine a set of gateways having a closest geographic proximity to the client device; and
   select the one or more other gateways determined to be suitable from the set of gateways having the closest geographic proximity to the client device.

5. The system of claim 1, wherein the query is an access point name (APN) query.

6. The system of claim 1, wherein the one or more other gateways are transmitted as part of a character string of an IP address.

7. A computer-implemented method for determining network access for a client device while roaming, the method comprising:
   receiving, at one or more processors of a visited communication network, a request for access from the client device, wherein the request includes global positioning system (GPS) data indicating a geographic location of the client device;
   determining, at the one or more processors of the visited communication network, that the client device is roaming;
   transmitting, by the one or more processors of the visited communication network, a query to a home communication network of the client device, the query including the GPS data indicating the geographic location of the client device;
   receiving, at the one or more processors of the visited communication network, a selection of one or more proposed network gateways disposed at one or more first locations based on the query;
   determining, at the one or more processors of the visited communication network, a selection of one or more other network gateways disposed at one or more additional locations;
   determining whether to transmit the selection of the one or more proposed network gateways or the selection of the one or more other network gateways based upon gateway functional statuses of the one or more proposed network gateways and the one or more other network gateways and respective proximities of the one or more first locations and the one or more additional locations to the geographic location of the client device; and transmitting, by the one or more processors of the visited communication network, the selection of the one or more other network gateways to the client device based on a determination result.

8. The computer-implemented method of claim 7, wherein the one or more proposed gateways and the one or more other gateways belong to the visited communication network.

9. The computer-implemented method of claim 7, wherein the one or more proposed gateways and the one or more other gateways include at least one Packet Data Network Gateway (PGW).

10. The computer-implemented method of claim 7, wherein determining the selection of the one or more other gateways further comprises:
  evaluating, at the one or more processors of the visited communication network, each of a plurality of gateways of the visited communication network to determine a respective proximity of each of the plurality of gateways to the client device; and
  comparing, at the one or more processors of the visited communication network, the respective proximity of each of the plurality of gateways of the visited communication network to determine a set of gateways having a closest geographic proximity to the client device.

11. The computer-implemented method of claim 7, wherein the query is an Access Point Name (APN) Query.

12. The computer-implemented method of claim 7, wherein the one or more other gateways are transmitted as part of a character string of an IP address.

13. A tangible, non-transitory computer-readable medium storing processor-executable instructions that, when executed by one or more processors of a system, cause the system to:
  receive, at one or more processors of a visited communication network, a request for access from a client device, wherein the request includes global positioning system (GPS) data indicating a geographic location of the client device;
  determine, at the one or more processors of the visited communication network, that the client device is roaming;
  transmit, at the one or more processors of the visited communication network, a query to a home communication network of the client device, the query including the GPS data indicating the geographic location of the client device;
  receive, at the one or more processors of the visited communication network, a selection of one or more proposed network gateways disposed at one or more first locations for the client device based on the query;
  determine, at the one or more processors of the visited communication network, a selection of one or more network other gateways disposed at one or more additional locations;
  determine, at the one or more processors of the visited communication network, whether to transmit the selection of the one or more proposed network gateways or the selection of the one or more other network gateways based upon respective gateway functional statuses of the one or more proposed network gateways and the one or more other network gateways and respective proximities of the one or more first locations and the one or more additional locations to the geographic location of the client device; and
  transmit, at the one or more processors of the visited communication network, the selection of the one or more proposed network gateways to the client device based on a determination result.

14. The tangible, non-transitory computer-readable medium of claim 13, wherein the processor-executable instructions, when executed, further cause the system to:
  evaluate each of a plurality of gateways of the visited communication network to determine a respective proximity of each of the plurality of gateways to the client device;
  compare the respective proximity of each of the plurality of gateways of the visited communication network to determine a set of gateways having a closest geographic proximity to the client device; and
  select the one or more other gateways determined to be suitable from the set of gateways having the closest geographic proximity to the client device.

15. The tangible, non-transitory computer-readable medium of claim 13, wherein the query is an Access Point Name (APN) Query.

16. The tangible, non-transitory computer-readable medium of claim 13, wherein the one or more proposed gateways and the one or more other gateways belong to the visited communication network.

17. The tangible, non-transitory computer-readable medium of claim 13, wherein the one or more proposed gateways and the one or more other gateways include at least one Packet Data Network Gateway (PGW).

* * * * *